United States Patent
Qin et al.

(10) Patent No.: US 10,050,709 B2
(45) Date of Patent: Aug. 14, 2018

(54) HIGH-SPEED OPTICAL MODULE FOR FIBRE CHANNEL

(71) Applicant: Wuhan Telecommunication Devices Co., Ltd., Wuhan (CN)

(72) Inventors: Yan Qin, Wuhan (CN); Liu Bo, Wuhan (CN); Jin Yang, Wuhan (CN)

(73) Assignee: WUHAN TELECOMMUNICATION DEVICES CO., LTD., Wuhan, Hubei Province (CN)

( * ) Notice: Subject to any disclaimer, the term of this patent is extended or adjusted under 35 U.S.C. 154(b) by 0 days.

(21) Appl. No.: 15/519,466

(22) PCT Filed: Dec. 19, 2014

(86) PCT No.: PCT/CN2014/094321
§ 371 (c)(1),
(2) Date: Apr. 14, 2017

(87) PCT Pub. No.: WO2016/058268
PCT Pub. Date: Apr. 21, 2016

(65) Prior Publication Data
US 2017/0237490 A1    Aug. 17, 2017

(30) Foreign Application Priority Data

Oct. 16, 2014    (CN) .......................... 2014 1 0549578

(51) Int. Cl.
*H04B 10/00* (2013.01)
*H04B 10/25* (2013.01)
(Continued)

(52) U.S. Cl.
CPC ......... *H04B 10/2504* (2013.01); *H04B 10/40* (2013.01); *H04B 10/502* (2013.01);
(Continued)

(58) Field of Classification Search
CPC .. H04B 10/2504; H04B 10/40; H04B 10/502; H04L 12/40; H04L 7/0075; H04L 7/0079
(Continued)

(56) References Cited

U.S. PATENT DOCUMENTS

| 7,174,106 B2 * | 2/2007 | Weber .................. H04B 10/801 398/135 |
| 7,296,936 B2 * | 11/2007 | Crews ....................... G02B 6/43 385/88 |

(Continued)

FOREIGN PATENT DOCUMENTS

CN          101656575 A          2/2010

OTHER PUBLICATIONS

Li, Li; Design and Implementing for 10 Gb/s Optical Transceiving Module; Dec. 31, 2012; 69 pgs.

*Primary Examiner* — Amritbir Sandhu
(74) *Attorney, Agent, or Firm* — Muncy, Geissler, Olds & Lowe, P.C.

(57) ABSTRACT

The present invention relates to the field of optical module, and provides a high-speed optical module for an optical fiber channel. The optical module can be used for 16G optical fiber channel, and comprises parts for emitting, receiving, clock data recovery and controlling. The optical module can be downward compatible with the application of 8G optical fiber channel and 4G optical fiber channel, support the diagnostic tests on optical circuit loopback and electrical circuit loopback, and provide stable receiving alarming. The optical module of the present invention, when serving as the interface between optical fiber channel systems and the interface between optical storage network storage devices, has the characteristics of miniaturization and low power consumption, and can improve port application density; the module supports hot swapping, which facilities the field debugging of the system, and can realize the replacing of the (Continued)

optical module without power down; and the module supports a digital diagnostic interface, and the network administrator can monitor the working state of the optical module by using the communication interface.

5 Claims, 2 Drawing Sheets

(51) Int. Cl.
    *H04B 10/40*     (2013.01)
    *H04B 10/50*     (2013.01)
    *H04L 7/00*     (2006.01)
    *H04L 12/40*     (2006.01)

(52) U.S. Cl.
    CPC .......... *H04L 7/0075* (2013.01); *H04L 7/0079* (2013.01); *H04L 12/40* (2013.01)

(58) Field of Classification Search
    USPC ................ 398/115, 116, 138, 154, 155, 167
    See application file for complete search history.

(56) References Cited

U.S. PATENT DOCUMENTS

| | | | |
|---|---|---|---|
| 7,734,184 B2* | 6/2010 | Nguyen | H04B 10/40 398/135 |
| 2005/0089027 A1* | 4/2005 | Colton | H04Q 11/0005 370/380 |
| 2007/0047881 A1* | 3/2007 | Mizuno | G02B 6/4292 385/92 |
| 2007/0086710 A1* | 4/2007 | Takizawa | H01R 12/721 385/88 |
| 2009/0269077 A1* | 10/2009 | Sone | H04B 10/40 398/135 |
| 2012/0275784 A1* | 11/2012 | Soto | H04B 10/2503 398/38 |
| 2014/0092394 A1* | 4/2014 | Detofsky | H04B 10/0731 356/501 |
| 2017/0078082 A1* | 3/2017 | Kao | H04N 7/22 |
| 2017/0237490 A1* | 8/2017 | Qin | H04B 10/40 398/116 |
| 2017/0331548 A1* | 11/2017 | Kim | H04B 10/0795 |
| 2017/0331579 A9* | 11/2017 | Soto | H04J 14/0298 |

* cited by examiner

HIGH-SPEED OPTICAL MODULE FOR FIBRE CHANNEL

TECHNICAL FIELD

The present invention relates to the field of optical communication, and particularly to a high-speed optical module for an optical fiber channel.

BACKGROUND ART

Along with the development of the global optical communication network, the importance of light receiving and emitting modules in the field of optical communication is increasingly significant. Optical communication devices and their technique are developing in the orientation of modularization, speedup, integration, diverse application occasions, multifunction, flexibility and low cost, and fiber optic communications of high speed and high quality have already become an inevitable trend of the development of the information industry.

Optical fiber channel technique is a novel network storage switching technique, and it can provide effective connection and a high bandwidth, and can realize the transmission of large-sized data files between memories, servers and nodes. Optical fiber channel is also an industrial standard interface, for transmitting information between the interfaces of computers and computer subsystems.

16G optical fiber channel is designed for high-band-width application programs and devices, including ISL (Cisco Inter-Switch Link Protocol), data migration, virtual desktop infrastructures, SSD or internal memory arrays. Another application of 16G optical fiber channel is to serve as the links between data centers, between storage arrays or between clouds. The 16G optical fiber channel standard increases doubly the speed of the physical interfaces of the optical fiber channel, and improves the past several generations of optical fiber channel technique. By employing 64b/66b encoding and linear variable, the standard does not only consume less electrical power per bit, but can also provide higher data transmission rates, need less equipment management and use less ports, and can reduce the numbers of line concentrators, switches and terminal equipments. However, what is currently common in the market is 4G/8G optical fiber channel optical modules, which have already been unable to adapt to the development of the industry.

TECHNICAL PROBLEM

In view of the above problems, an object of the present invention is to provide a high-speed optical module for an optical fiber channel. The high-speed light receiving and emitting module, when serving as the interface between optical fiber channel systems and the interface between optical storage network storage devices, has the advantages of miniaturization, hot swapping, low power consumption, digital diagnosis and so on, which can satisfy the ever growing demand on the application of 16G optical fiber channel.

TECHNICAL SOLUTION

The present invention is implemented as follows: the high-speed optical module for an optical fiber channel comprises:

a hot swappable electrical connector, for providing a data and signal transmission electrical interface between the optical module and a system board;

an emission waveshaping electrical circuit, for waveshaping an emitted electrical signal that is received, to compensate loss in a transmission medium and reset jitter budget;

a transmitter clock data recovery unit, for extracting a synchronous signal from the emitted electrical signal, performing timing determination, and removing jitter and noise, to recover a data signal;

a diode driving electrical circuit, for providing a proper bias current and a proper modulating current, to drive a vertical cavity laser emission diode;

the vertical cavity laser emission diode, for performing electrical optical conversion to the received electrical signal and outputting an optical signal;

a detector, for receiving the optical signal and completing photovoltaic conversion;

a pre-amplification electrical circuit, for preliminarily amplifying the received electrical signal;

a limiting amplification electrical circuit, for further amplifying the received electrical signal;

a receiver clock data recovery unit, for extracting a synchronous signal from the received electrical signal, performing timing determination, and removing jitter and noise, to recover a data signal;

a receiving equalizer electrical circuit, for optimizing connection performance and a dispersive parameter; and a controlling unit, for configuring an working mode of the optical module according to a controlling command issued by a network administrator, and monitoring working state of the optical module, and reporting related data;

wherein the hot swappable electrical connector, the emission waveshaping electrical circuit, the transmitter clock data recovery unit, the diode driving electrical circuit and the vertical cavity laser emission diode are connected in sequence; the detector, the pre-amplification electrical circuit, the limiting amplification electrical circuit, the receiver clock data recovery unit, the receiving equalizer electrical circuit and the hot swappable electrical connector are connected in sequence; and the controlling unit is individually connected to the transmitter clock data recovery unit, the diode driving electrical circuit, the limiting amplification electrical circuit, the receiver clock data recovery unit and the hot swappable electrical connector.

Preferably, the diode driving electrical circuit is integrated in the interior with an eye pattern shaper and an automatic power control loop.

Preferably, the high-speed optical module further comprises:

a human eye safety electrical circuit, for continuously monitoring a light output power of the vertical cavity laser emission diode, and when it is detected that a certain unsafe condition exceeds a predefined range, turning off the emitting part.

Preferably, the high-speed optical module further comprises:

an alarming controlling electrical circuit, comprising a signal marker and a grounded sampling resister, wherein the alarming controlling electrical circuit is for obtaining a corresponding detector current mirror value from the outputted optical signal by a received signal marker, converting to voltage by using the grounded sampling resister, and inputting to the controlling unit, so that the controlling unit in real time gathers a size of the received optical signal, and when the received optical signal is less than a power threshold, outputting an alarming signal.

Preferably, the working mode of the optical module comprises a normal receiving and emitting mode, an optical circuit loopback mode and an electrical circuit loopback mode.

ADVANTAGEOUS EFFECTS

The advantageous effects of the present invention are: the high-speed optical module that is provided by the present invention employs a 850 nm VCSEL (Vertical Cavity Surface Emitting Laser), and has small working current; the modulation rate is high, and the bit rate can reach 14.025G; the module is provided with a digital monitoring interface, to provide the real time status parameters of the optical module; the module can realize optical loopback and electrical loopback; the module can provide a stable receiving alarming mode; and by test, the transmission on a 50 μm MMF (2000 MHz·km) can reach 100 meters.

A 16G optical fiber channel, by using the optical module of the present invention, can use less ports and have less power consumption per bit. The optical module is a short distance product which can provide a higher level of speed and a higher level of connection port density to the new generation of network devices.

EMBODIMENTS OF THE PRESENT INVENTION

Figure 1:
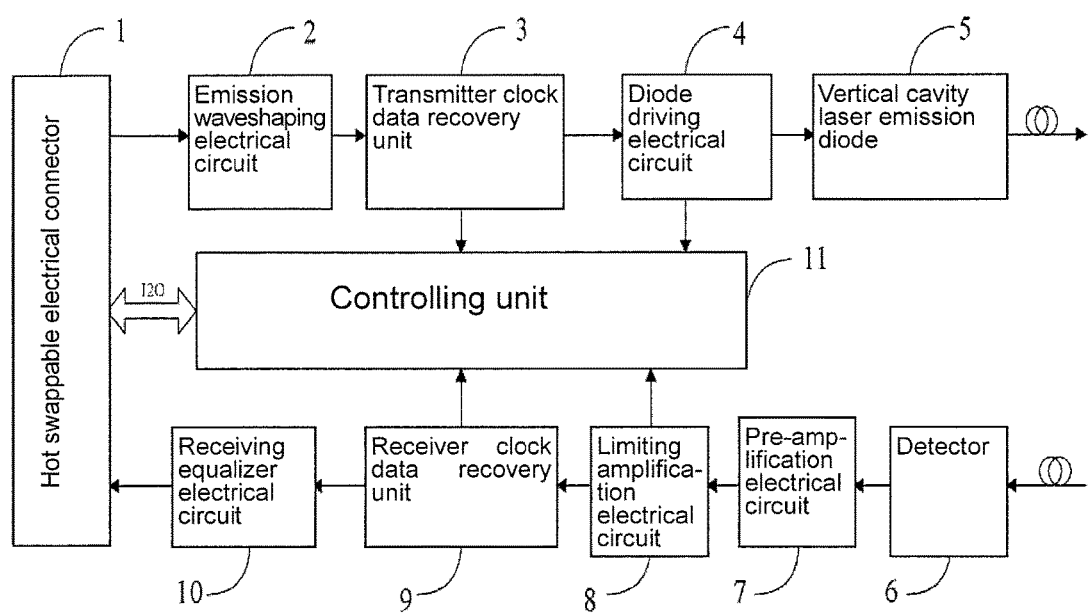
FIG. 1 is the diagram of the structure of the principle of the high-speed optical module for an optical fiber channel that is provided by an embodiment of the present invention.

In order to make the purposes, the technical solutions and the advantages of the present invention more clear, the present invention will be further described in detail below by referring to the drawings and the embodiments. It should be understood that, the particular embodiments described herein are merely intended to explain the present invention, but are not to limit the present invention.

In order to illustrate the technical solutions of the present invention, it will be described below with reference to the particular embodiments.

As shown in FIG. 1, the high-speed optical module for an optical fiber channel that is provided by an embodiment of the present invention comprises:

a hot swappable electrical connector 1, for providing a data and signal transmission electrical interface between the optical module and a system board; an emission waveshaping electrical circuit 2, for waveshaping an emitted electrical signal that is received, to compensate loss in a transmission medium and reset jitter budget; a transmitter clock data recovery unit 3, for extracting a synchronous signal from the emitted electrical signal, performing timing determination, and removing jitter and noise, to recover a data signal; a diode driving electrical circuit 4, for providing a proper bias current and a proper modulating current, to drive a vertical cavity laser emission diode; a vertical cavity laser emission diode 5, for performing electrical optical conversion to the received electrical signal and outputting an optical signal; a detector 6, for receiving the optical signal and completing photovoltaic conversion; a pre-amplification electrical circuit 7, for preliminarily amplifying the received electrical signal; a limiting amplification electrical circuit 8, for further amplifying the received electrical signal; a receiver clock data recovery unit 9, for extracting a synchronous signal from the received electrical signal, performing timing determination, and removing jitter and noise, to recover a data signal; a receiving equalizer electrical circuit 10, for optimizing connection performance and a dispersive parameter; and a controlling unit 11, for configuring an working mode of the optical module according to a controlling command issued by a network administrator, and monitoring working state of the optical module, and reporting related data; wherein the hot swappable electrical connector 1, the emission waveshaping electrical circuit 2, the transmitter clock data recovery unit 3, the diode driving electrical circuit 4 and the vertical cavity laser emission diode 5 are connected in sequence; the detector 6, the pre-amplification electrical circuit 7, the limiting amplification electrical circuit 8, the receiver clock data recovery unit 9, the receiving equalizer electrical circuit 10 and the hot swappable electrical connector 1 are connected in sequence; and the controlling unit 11 is individually connected to the transmitter clock data recovery unit 3, the diode driving electrical circuit 4, the limiting amplification electrical circuit 8, the receiver clock data recovery unit 9 and the hot swappable electrical connector 1.

The high-speed optical module that is provided by the present embodiment is used for a 16G optical fiber channel, and comprises parts for emitting, receiving, clock data recovery and controlling. In use, the high-speed optical module is inserted in an electrical interface of a system device, and the optical module can exchange data and signals with the system board of the system device. Specially, in the light emission part, the inputted electrical signal that is from the system board passes through the emission waveshaping electrical circuit to be signal-reshaped, to compensate the loss in the transmission medium and reset the jitter budget, then passes through the transmitter clock data recovery unit to be recovered to obtain a synchronous signal and a data signal, and then passes through the driving electrical circuit to provide a proper bias current and a proper modulating current to the VCSEL. Preferably, the driving electrical circuit is integrated in the interior with an eye pattern shaper and an automatic power control loop, and the driving electrical circuit drives the VCSEL to emit light, to realize photovoltaic conversion. In the light receiving part, the detector receives an optical signal that is from the system input, converts to an electrical signal, passes it through the pre-amplification electrical circuit and the limiting amplification electrical circuit to obtain an amplified electrical signal, then passes it through the receiver clock data recovery unit to be recovered to obtain a synchronous signal and a data signal, and finally passes it through the receiving equalizer electrical circuit to output an electrical signal. The receiving equalizer electrical circuit employs an equalizer that uses a high peak value, to optimize the connection performance and parameters such as dispersion.

The high-speed optical module that is provided by the embodiment of the present invention can be downward compatible with the application of 8G optical fiber channel and 4G optical fiber channel. The high-speed optical module, in order to assist the optimization of local host or remote diagnosis, is provided with the functions of high-speed data optical circuit loopback and electrical circuit loopback, to assist local host or remote diagnosis and optimize time sequence. The loopback function can be controlled by I2C bus; that is, the controlling unit and the hot swappable electrical connector are connected by an I2C interface, and the controlling unit comprises an EEPROM. In the present embodiment, the controlling unit comprises a digital diagnostic interface, by which the network administrator can monitor the working state of the optical module.

Figure 2:
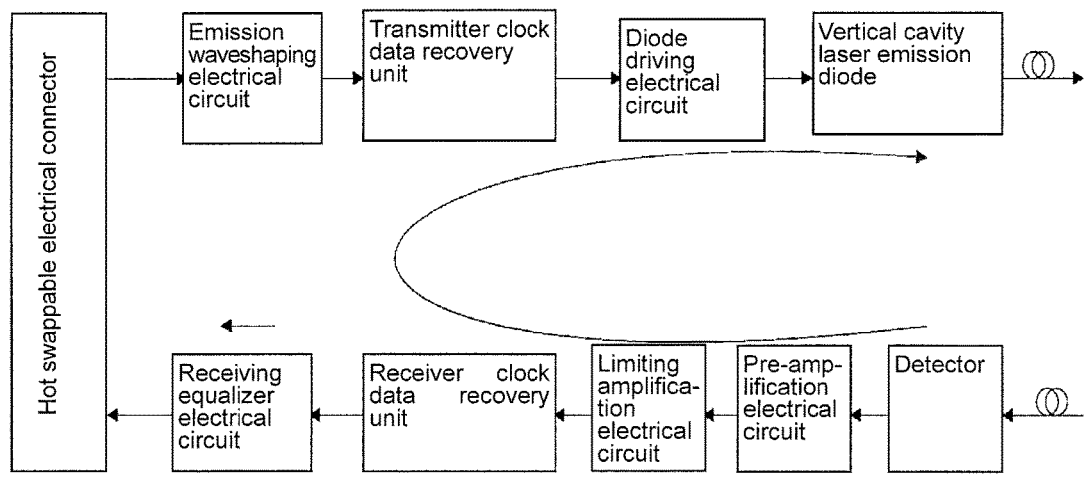
FIG. 2 is the schematic diagram of the diagnostic test of the optical circuit loopback of the high-speed optical module that is provided by the embodiment of the present invention.

The schematic diagram of the diagnostic test of the optical circuit loopback is shown in FIG. 2 (the figure does not show the controlling unit). Firstly, the network administrator sets the working mode of the optical module by configuring the EEPROM of the optical module, and the optical module, after receiving the command, realizes different working modes, wherein the working mode of the optical module is set to be the optical circuit loopback mode. In this mode, the flow of the optical signal is as follows:

Detector⇒Pre-amplification electrical circuit⇒Limiting amplification electrical circuit⇒Receiver clock data recovery unit⇒Transmitter clock data recovery unit⇒Diode driving electrical circuit⇒Vertical cavity laser emission diode.

Every time one bit of the optical signal is received, jitter is removed by the receiver clock data recovery unit and the transmitter clock data recovery unit, and the signal is sent out again by the optical circuit. At this point the optical module automatically emits and receives, and can diagnose the malfunction state and the malfunctioned points of the optical circuit according to the loopback situation, and optimize the optical module. The optical module supports two different ways of optical circuit loopback, which are the normal outputting of the electrical signal of the hot swappable electrical connector and the turning off of the outputting of the electrical signal of the hot swappable electrical connector.

Figure 3:
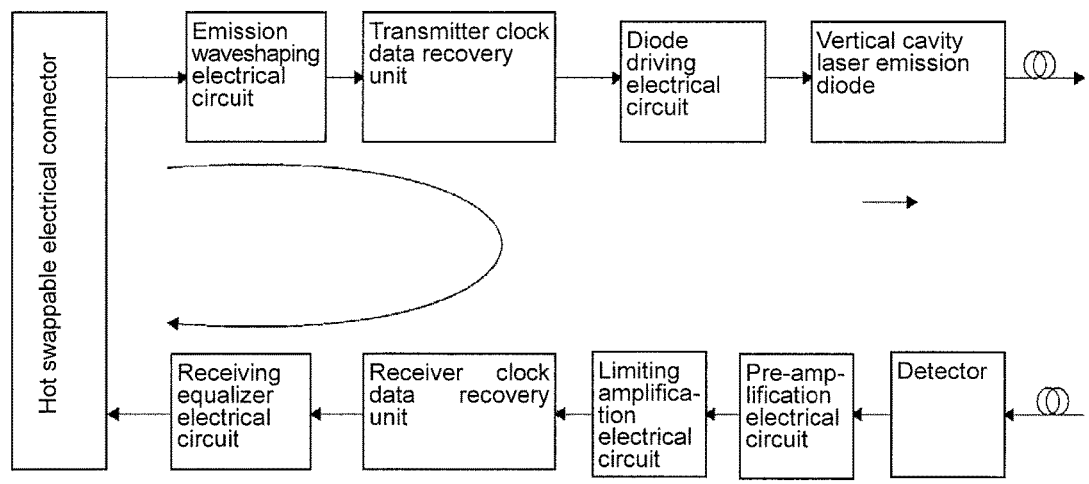
FIG. 3 is the schematic diagram of the diagnostic test of the optical circuit loopback of the high-speed electrical module that is provided by the embodiment of the present invention.

The schematic diagram of the loopback diagnostic test of the electrical circuit is shown in FIG. 3 (the figure does not show the controlling unit). Firstly, the network administrator sets the working mode of the optical module by configuring the EEPROM of the optical module, and the optical module, after receiving the command, realizes different working modes, wherein the working mode of the optical module is set to be the electrical circuit loopback mode. In this mode, the flow of the electrical signal is as follows:

Emission waveshaping electrical circuit⇒Transmitter clock data recovery unit⇒Receiver clock data recovery unit⇒Receiving equalizer electrical circuit.

Every time one bit of the electrical signal is received, jitter is removed by the transmitter clock data recovery unit and the receiver clock data recovery unit, and the signal is sent out again by the electrical circuit. At this point the optical module automatically emits and receives, and can diagnose the malfunction state and the malfunctioned points of the optical circuit according to the loopback situation, and optimize the time sequence. The optical module supports two different ways of electrical circuit loopback, which are the normal light emitting of the VCSEL and the turning off of the light emitting of the VCSEL.

In addition, as a preferable embodiment, the high-speed optical module that is provided by the present embodiment further comprises:

a human eye safety electrical circuit, for continuously monitoring a light output power of the VCSEL, and when it is detected that a certain unsafe condition exceeds a predefined range, turning off the emitting part. The unsafe condition may probably be from the system motherboard, such as voltage fluctuation and unbalanced coding, or be an internal fault of the optical module. The high-speed optical module satisfies the CLASS 1 level human eye safety design, and meets the requirements by the criteria of the reliability tests on integrated circuits.

Preferably, the high-speed optical module further comprises:

an alarming controlling electrical circuit, comprising a signal marker and a grounded sampling resister, for obtaining a corresponding detector current mirror value from the outputted optical signal by a received signal marker, converting to voltage by using the grounded sampling resister, and inputting to the controlling unit, so that the controlling unit in real time gathers a size of the received optical signal, and when the received optical signal is less than a power threshold, outputting an alarming signal. The hysteresis design is greater than 1 dB, which can avoid the alarming output level generating chirp when the inputted signal approaches the threshold.

In conclusion, the present embodiment provides a high-speed optical module for an optical fiber channel. The optical module has a high working speed, good speed compatibility and convenient control. By test, the range of the working temperature of the high-speed optical module that is provided by the present invention can reach −5-75 degrees centigrade, and within the whole temperature range the optical power is stable, the optical eye pattern and the electrical eye pattern satisfy the requirements by standard templates, the eye pattern has a large allowance, and the jitter performance is excellent. The optical module supports loopback function, to assist local host or remote diagnosis and optimize time sequence, and facilitate the controlling and affirming of problems. The mode of receiving and alarming on the basis of power control, and the criterion of hysteresis greater than 1 dB, provide stable alarming output level signals.

The above description is merely preferred embodiments of the present invention, and is not indented to limit the present invention. Any modifications, equivalent substitutions and improvements that are made within the spirit and principle of the present invention should fall within the protection scope of the present invention.

The invention claimed is:

1. A high-speed optical module for an optical fiber channel, wherein, the high-speed optical module comprises:
   a hot swappable electrical connector, for providing a data and signal transmission electrical interface between the high-speed optical module and a system board;
   an emission waveshaping electrical circuit, for waveshaping an emitted electrical signal that is received, to compensate loss in a transmission medium and reset jitter, wherein a first synchronous signal is extracted from the emitted electrical signal, and jitter and noise are removed to recover a data signal;
   a diode driving electrical circuit, for providing a proper bias current and a proper modulating current, to drive a vertical cavity laser emission diode;
   the vertical cavity laser emission diode, for performing electrical optical conversion to the received electrical signal and outputting an optical signal;
a detector, for receiving the optical signal and completing photovoltaic conversion; a pre-amplification electrical circuit, for preliminarily amplifying the received electrical signal;
   a limiting amplification electrical circuit, for further amplifying the received electrical signal, wherein a second synchronous signal is extracted from the received electrical signal and jitter and noise are removed to recover a second data signal;
a receiving equalizer electrical circuit, for optimizing connection performance and a dispersive parameter; and
a controller for configuring a working mode of the high-speed optical module according to a controlling command issued by a network administrator, and monitoring a working state of the high-speed optical module, and reporting related data;
wherein the hot swappable electrical connector, the emission waveshaping electrical circuit, the diode driving electrical circuit and the vertical cavity laser emission diode are connected in sequence; the detector, the pre-amplification electrical circuit, the limiting amplification electrical circuit, the receiving equalizer electrical circuit and the hot swappable electrical connector are connected in sequence; and the controller is individually connected to the diode driving electrical circuit, the limiting amplification electrical circuit, and the hot swappable electrical connector.

2. The high-speed optical module for the optical fiber channel according to claim 1, wherein, the diode driving electrical circuit is integrated in thean interior with an eye pattern shaper and an automatic power control loop.

3. The high-speed optical module for the optical fiber channel according to claim 2, further comprising:
a human eye safety electrical circuit, for continuously monitoring a light output power of the vertical cavity laser emission diode, and when it is detected that a certain unsafe condition exceeds a predefined range, turning off the emitting part.

4. The high-speed optical module for the optical fiber channel according to claim 3, further comprising:
an alarming controlling electrical circuit, comprising a signal marker and a grounded sampling resister, for obtaining a corresponding detector current mirror value from the outputted optical signal by the signal marker, converting to voltage by using the grounded sampling resister, and inputting to the unit controller, so that the controller in real time gathers a size of the received optical signal, and when the received optical signal is less than a power threshold, outputting an alarming signal.

5. The high-speed optical module for the optical fiber channel according to claim 1, wherein, the working mode of the high-speed optical module comprises a normal receiving and emitting mode, an optical circuit loopback mode and an electrical circuit loopback mode.

* * * * *